United States Patent [19]
DeFusco

[11] 3,819,142
[45] June 25, 1974

[54] LOCKING MECHANISM FOR A TILTING VEHICLE SEAT
[75] Inventor: Ernest L. DeFusco, Clawson, Mich.
[73] Assignee: General Motors Corporation, Detroit, Mich.
[22] Filed: Nov. 20, 1972
[21] Appl. No.: 308,028

[52] U.S. Cl. ................................ 248/397, 403/92
[51] Int. Cl. ........................................... F16m 13/00
[58] Field of Search .......... 248/394, 396, 397, 398, 248/371, 423; 297/313; 292/270, 272, 274; 403/92

[56] References Cited
UNITED STATES PATENTS
1,788,113   1/1931   Leach .............................. 248/397
2,308,714   1/1943   Ralston ............................ 248/423
2,593,312   4/1952   Joseph ......................... 292/270 X FOREIGN PATENTS OR APPLICATIONS
995,133   6/1965   Great Britain ..................... 248/397
 28,433   8/1884   Germany .......................... 292/274

Primary Examiner—William H. Schultz
Assistant Examiner—Robert W. Gibson, Jr.
Attorney, Agent, or Firm—Herbert Furman

[57] ABSTRACT

A locking mechanism for holding a tilting vehicle seat in a selected tilted position includes a locking element mounted on the seat adjuster which supports the seat for this tilting movement. The locking element includes an elongated arcuate slot generated about the axis of seat movement and including locking openings along each of its sides. These locking openings are arranged in opposed pairs along lines oriented at 45° to the elongated axis of the slot. A locking bar is rotatably mounted on the seat and includes an end portion of a generally rectangular cross section received within the slot in the locking element. A handle of the locking bar allows selective movement of the end portion between a first position where it is aligned with the slot to allow tilting seat movement and a second position where it is received within a selected pair of the locking openings to hold the seat in a selected tilted position. A positioning member is spring biased into engagement with a portion of the locking bar and includes a positioning groove for initially positioning the seat in an intermediate tilted position so as to align the end portion of the locking bar with the associated pair of locking openings for movement thereinto upon selected rotation of the locking bar.

4 Claims, 4 Drawing Figures

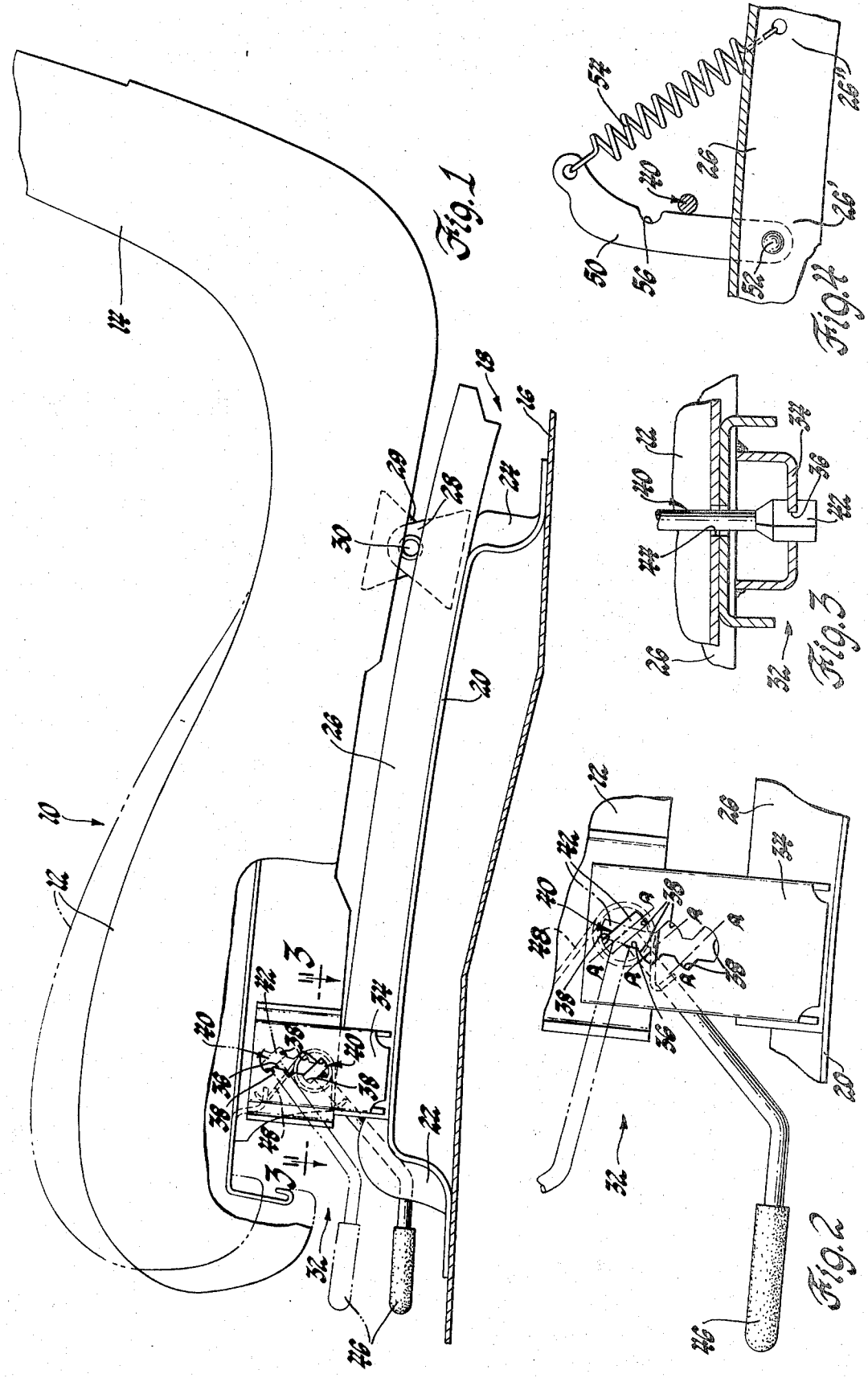

3,819,142

LOCKING MECHANISM FOR A TILTING VEHICLE SEAT

BACKGROUND OF THE INVENTION

This invention relates generally to a tilting vehicle seat, and more particularly to a locking mechanism for holding the seat in a selected tilted position.

Tilting vehicle seats are well known and have been used on production vehicles for many years. These seats are supported for rotational movement about an axis which extends laterally of the associated vehicle generally adjacent the lower seat cushion of the seat. In the past, locking mechanisms for holding these seats in a selected tilted position have included a locking element with a number of vertically spaced notches for selectively receiving a movable locking bar that is bodily moved into and out of engagement with a selected notch to thus position the seat.

SUMMARY OF THE INVENTION

One feature of this invention is that it provides an improved locking mechanism extending between a vehicle floor and an associated tilting seat, and the locking mechanism includes a locking element with an elongated slot having side locking openings arranged in opposed pairs oriented along lines which are oblique relative to the elongated axis of the slot so as to selectively receive a generally rectangularly cross-sectioned locking portion of a rotatable locking bar in a selected pair of the locking openings to selectively hold the seat in an associated tilted position from which tilting movement is possible by rotation of the locking bar to align the locking portion with the elongated slot. Another feature of the invention is that the seat is supported for its tilting movement by a seat adjuster which also supports the locking element of the locking mechanism, and the rotatable locking bar is supported by the seat cushion of this seat for manually operable movement between the locked and unlocked positions. Another feature of the invention is that the generally elongated slot of the locking element is generated about the axis of tilting movement of the seat. Another feature of the invention is that the lines along which the opposed pairs of locking openings are arranged are oriented at about 45° to the elongated axis of the slot in the locking element and the locking portion of the locking bar is defined by a flattened end portion which is received within the slot for movement between the locked and unlocked positions. Another feature of the invention is that a positioning member is biased into engagement with the locking bar and includes a positioning portion for receiving the locking bar to initially position the seat in an intermediate tilted position so as to align the end portion of the locking bar with the associated pair of locking openings for movement thereinto upon selected rotation of the locking bar.

BRIEF DESCRIPTION OF THE DRAWINGS

The above-specified features and other features of the present invention are readily apparent from the following detailed description of the preferred embodiment and the drawings in which:

FIG. 1 is a sectional view through a vehicle floor and shows a tilting vehicle seat with a locking mechanism constructed in a manner according to this invention;

FIG. 2 is an enlarged view of the locking mechanism shown in FIG. 1 with this locking mechanism shown in a solid line indicated locked position and a phantom line indicated unlocked position;

FIG. 3 is an enlarged sectional view through the locking mechanism taken generally along line 3—3 of FIG. 1; and FIG. 4 is a view of a positioning member which is spring biased into engagement with a portion of the locking bar of the locking mechanism to initially position the vehicle seat in an intermediate tilted position prior to movement of the locking bar from its unlocked position to its locked position.

DETAILED DESCRIPTION OF THE PREFERRED EMBODIMENT

Referring to FIG. 1 of the drawings, a vehicle seat generally indicated by 10 includes a seat cushion 12 and a seat back 14. The seat 10 is mounted on a vehicle floor 16 by a seat adjuster indicated generally by 18. Seat adjuster 18 includes a lower track member 20 with a front leg 22 suitably secured to a forward portion of floor 16 and a rear leg 24 likewise suitably secured to a rear portion of the floor. A movable upper track member 26 is slidable along the lower track member 20 in a conventional manner to provide the seat 10 with the standard forward and rearward adjusting movement. A conventional locking mechanism, not shown, selectively locks the movable track member 26 at any of a number of longitudinal positions to thus maintain the seat 10 in a selected longitudinal position.

The rear end of the upper movable track member 26 supports an apertured member 28 which is cooperable with an apertured member 29 on the seat cushion 12 to provide aligned apertures which receive a pintle tube 30 that extends transversely of the seat 10. This pintle tube 30 is also received by similar apertured members in a like seat adjuster 18 on the other side of the seat 10 and supports the seat for tilting movement between the lower solid line indicated position of FIG. 1 and the upper phantom line indicated position. Tilting movement of the seat in this manner allows an occupant to choose a selected tilted position which affords the most comfort while in seated position.

A locking mechanism according to this invention is generally indicated by 32 and extends between the forward ends of seat adjuster 18 and the seat cushion 12. A similar locking mechanism also extends between the forward end of the seat adjuster and the seat cushion at the other side of the seat in a symmetrical manner. Locking mechanism 32 includes a locking element 34 whose lower end is suitably secured to the forward end of the upper movable track member 26. The locking element, as can be best seen by additionally referring to FIG. 2, includes a generally vertically extending arcuate slot 36 which is generated about the axis of seat movement around pintle tube 30. At each of its sides, the slot 36 includes locking openings 38 which are arranged in opposed pairs oriented along lines A—A. These lines A—A are oriented at about 45° to the elongated arcuate axis of slot 36.

The locking mechanism 32 also includes a movable locking bar 40 which, as can be seen by additionally referring to FIG. 3, extends laterally of the vehicle supporting seat 10. Locking bar 40 includes a flattened end or locking portion 42 which is received within slot 36 in the locking element 34. The locking bar extends inwardly from end portion 42 through an aperture 44 in the framework of seat cushion 12 and has a round cylindrical portion supported by this seat cushion framework for rotational movement about its longitudinal axis by a pintle support means that is not shown. The locking bar extends from this pintle support means to the other side of seat 10 where it includes another flattened end or locking portion that is similarly associated and operable with a symmetrical locking mechanism on that side of the seat. A manually actuated handle 46 is connected to the locking bar 40 intermediate its ends and is selectively rotated to move the locking bar between its solid line indicated and phantom line indicated locked and unlocked positions shown in FIG. 2. A torsion spring 48 extends between the seat cushion framework and the handle 46 as seen in FIGS. 1 and 2 so as to bias the locking bar to its locked position. The flattened locking portion 42 of locking bar 40 is received within a selected pair of the opposed locking openings in locking element 34 when the locking bar is in locked position. With the locking bar thus situated in this locked position, upward or downward seat movement from the selected position is prevented by engagement of the locking portion 42 with the locking element 34 at the portions of the locking element defining the locking openings 38.

When an occupant desires to tilt the seat 10 to a different position, the occupant first pivots the handle 46 of locking bar 40 upwardly so as to rotate the locking portion 42 into alignment with the elongated axis of slot 36 in locking element 34. The occupant then shifts his weight to tilt the seat to the desired tilted seat position and the locking portion 42 slides through the slot 36 due to its aligned relationship with this slot. When the occupant has reached the desired tilted position, the handle 46 is released and spring action moves the handle 46 downwardly to move the locking portion 42 to the desired locked position into the associated pair of opposed locking openings 38.

As seen in FIG. 4, a control or positioning member 50 has its lower end secured to a portion 26' of the movable upper track member 26 by a pin 52. The upper end of this positioning member attaches one end of a helical spring 54 whose other end is attached to another portion 26'' of track member 26. The spring 54 normally biases the positioning member 50 into engagement with the round cylindrical portion of locking bar 40. A slot 56 in the positioning member receives this portion of the locking bar when the seat 10 is tilted to an intermediate tilted position corresponding with the intermediate set of opposed locking openings 38 in the locking element 34. This positioning gives an occupant a feel as to when the seat 10 is located in the intermediate tilted position so that the locking bar may be readily moved to locked position with the flattened locking portion 42 received within the associated locking openings 38 in the locking element. If this positioning member is not provided with the locking mechanism, an occupant must "hunt" or "fish" for the intermediate position before locking of the mechanism in this position can be achieved.

The invention thus provides an improved locking mechanism for a tilting vehicle seat.

I claim:

1. In a vehicle seat including a seat cushion member and means pivotally supporting a rear portion of the seat on a vehicle floor member for tilting movement relative thereto, a locking mechanism for holding the seat in a selected tilted position comprising, a locking element mounted on one of the members and defining an elongated slot with locking openings on each side of the slot, the locking openings being arranged in opposed pairs along lines which are oblique relative to the elongated axis of the slot, a locking bar rotatably mounted on the other member and including a locking portion of a generally rectangular cross section, the locking portion of the locking bar being received within the slot in the locking element, means for selectively rotating the locking bar between a first position where its locking portion is aligned with the slot in the locking element to allow tilting seat movement and a second position where the locking portion is received by a selected pair of the locking openings to hold the seat in a selected tilted position, and a positioning element mounted on the one member so as to be biased into engagement with the locking bar and including a positioning portion for receiving the locking bar to initially position the seat in an intermediate tilted position and align the end portion of the locking bar with the associated pair of locking openings for movement thereinto upon selected rotation of the locking bar.

2. In a vehicle seat including a seat cushion and a seat adjuster pivotally supporting a rear portion of the seat on a vehicle floor for tilting movement relative thereto, a locking mechanism for holding the seat in a selected tilted position comprising, a locking element mounted on the seat adjuster and defining an elongated arcuate slot generated about the axis of tilting seat movement, the slot including locking openings at each side thereof and these locking openings being arranged in opposed pairs along lines which are oblique relative to the elongated axis of the slot, a locking bar rotatably mounted on the seat cushion and including a locking portion of a generally rectangular cross section, the locking portion of the locking bar being received within the slot in the locking element, manually operable means for selectively rotating the locking bar between a first position where its locking portion is aligned with the slot in the locking element to allow tilting seat movement and a second position where the locking portion is received by a selected pair of the locking openings to hold the seat in a selected tilted position, and a positioning member mounted on the seat adjuster so as to be spring biased into engagement with the locking bar and including a positioning portion for receiving the locking bar to initially position the seat in an intermediate tilted position and align the end portion of the locking bar with the associated pair of locking openings for movement thereinto upon selected rotation of the locking bar.

3. In a vehicle seat including a seat cushion and a seat adjuster pivotally supporting a rear portion of the seat on a vehicle floor for tilting movement relative thereto, a locking mechanism for holding the seat in a selected tilted position comprising, a locking element mounted on the seat adjuster and defining an elongated arcuate slot generated about the axis of tilting seat movement, the slot including locking openings at each side thereof and these openings being arranged in opposed pairs along lines oriented at about 45° to the elongated axis of the slot, a locking bar rotatably mounted on the seat cushion and including an end portion of a generally rectangular cross section, the end portion of the locking bar being received within the slot in the locking element, a handle connected to the locking bar so as to allow selective rotation of the locking bar between a first position where its end portion is aligned with the slot in the locking element to allow tilting seat movement and a second position where the locking portion is received by a selected pair of the locking openings to hold the seat in a selected tilted position, a positioning member pivotally supported on the seat adjuster and including a slot, and a helical spring extending between the positioning member and the seat adjuster in a manner that biases the positioning member into engagement with the locking bar so that the slot receives the locking bar to initially position the seat in an intermediate tilted position and align the end portion of the locking bar with the associated pair of locking openings for movement thereinto upon selected rotation of the locking bar.

4. In a vehicle seat including a seat cushion and a seat adjuster pivotally supporting a rear portion of the seat on a vehicle floor for tilting movement relative thereto, a locking mechanism for holding the seat in a selected tilted position comprising, a locking element mounted on the seat adjuster and defining an elongated arcuate slot generated about the axis of tilting seat movement, the slot including locking openings at each side thereof and these openings being arranged in opposed pairs along lines oriented at about 45° to the elongated axis of the slot, a locking bar rotatably mounted on the seat cushion and including an end portion of a generally rectangular cross section, the end portion of the locking bar being received within the slot in the locking element, a handle connected to the locking bar so as to allow selective rotation of the locking bar between a first position where its end portion is aligned with the slot in the locking element to allow tilting seat movement and a second position where the end portion is received by a selected pair of the locking openings to hold the seat in a selected tilted position, and a positioning member mounted on the seat adjuster so as to be biased into engagement with the locking bar and including a positioning portion for receiving the locking bar to initially position the seat in an intermediate tilted position and align the end portion of the locking bar with the associated pair of locking openings for movement thereinto upon selected rotation of the locking bar.

* * * * *